US012786152B2

(12) United States Patent
Yagnik et al.

(10) Patent No.: US 12,786,152 B2
(45) Date of Patent: Nov. 3, 2026

(54) DETERMINING EVENTS THAT PREVENT PROCESSING OF EMAIL MESSAGES

(71) Applicant: Sophos Limited, Abingdon (GB)

(72) Inventors: Vivek Rudraduttbhai Yagnik, British Columbia (CA); Balakrishnan Rajkumar, Tamil Nadu (IN); Niravbhai Dineshkumar Sanghavi, Ahmedabad (IN); John Mears, Camarthen (GB)

(73) Assignee: Sophos Limited, Abingdon (GB)

( * ) Notice: Subject to any disclaimer, the term of this patent is extended or adjusted under 35 U.S.C. 154(b) by 97 days.

(21) Appl. No.: 18/826,122

(22) Filed: Sep. 5, 2024

(65) Prior Publication Data

US 2025/0310288 A1 Oct. 2, 2025

(30) Foreign Application Priority Data

Mar. 29, 2024 (IN) ............................ 202411025855

(51) Int. Cl.
*H04L 51/212* (2022.01)
*H04L 51/063* (2022.01)
*H04L 51/42* (2022.01)

(52) U.S. Cl.
CPC .......... *H04L 51/212* (2022.05); *H04L 51/063* (2013.01); *H04L 51/42* (2022.05)

(58) Field of Classification Search
CPC ...... H04L 51/212; H04L 51/063; H04L 51/42
See application file for complete search history.

(56) References Cited

U.S. PATENT DOCUMENTS

| | | | | |
|---|---|---|---|---|
| 6,073,142 | A * | 6/2000 | Geiger | G06Q 10/107 709/204 |
| 6,862,622 | B2 * | 3/2005 | Jorgensen | H04L 1/20 709/229 |
| 7,032,030 | B1 * | 4/2006 | Codignotto | G06Q 10/107 713/170 |
| 8,042,149 | B2 * | 10/2011 | Judge | G06F 21/554 726/13 |
| 8,565,249 | B2 * | 10/2013 | Isaksson | H04L 47/30 370/429 |
| 8,566,839 | B2 * | 10/2013 | Johnson | G06Q 30/00 719/310 |
| 2002/0120697 | A1 * | 8/2002 | Generous | H04L 67/306 709/206 |
| 2005/0232193 | A1 * | 10/2005 | Jorgensen | H04W 28/20 370/341 |
| 2007/0038753 | A1 * | 2/2007 | Jorgensen | H04W 12/033 709/226 |

(Continued)

*Primary Examiner* — Jimmy H Tran
(74) *Attorney, Agent, or Firm* — IP Spring

(57) ABSTRACT

A computer-implemented method includes receiving an email message to be processed by a plurality of computing systems, where the plurality of computing systems each provide a different service for emails. The method further includes generating a first request for a first computing system of the plurality of computing systems to process the email message. The method further includes adding the first request for the first computing system to a first request queue. The method further includes responsive to determining that a predetermined event has occurred for the first request queue, performing a skip action and removing the first request from the first request queue.

20 Claims, 5 Drawing Sheets

(56) References Cited

U.S. PATENT DOCUMENTS

| | | | | |
|---|---|---|---|---|
| 2007/0300286 | A1* | 12/2007 | Judge | G06F 21/577 726/1 |
| 2008/0065736 | A1* | 3/2008 | Gross | G06Q 10/107 709/207 |
| 2009/0248814 | A1* | 10/2009 | Kelly | H04L 51/212 709/206 |
| 2010/0202469 | A1* | 8/2010 | Isaksson | H04L 47/30 370/412 |
| 2012/0204265 | A1* | 8/2012 | Judge | H04L 63/145 726/22 |
| 2013/0295975 | A1* | 11/2013 | Johnson | G06Q 30/00 455/466 |
| 2017/0048273 | A1* | 2/2017 | Bach | H04L 51/212 |
| 2019/0098037 | A1* | 3/2019 | Shenoy, Jr. | G06F 11/3006 |
| 2019/0104155 | A1* | 4/2019 | DiCorpo | H04L 63/20 |
| 2019/0199745 | A1* | 6/2019 | Jakobsson | H04L 51/212 |
| 2020/0153855 | A1* | 5/2020 | Kirti | H04L 63/20 |
| 2020/0302058 | A1* | 9/2020 | Kenyon | G06F 21/554 |
| 2021/0021612 | A1* | 1/2021 | Higbee | H04L 63/1416 |
| 2021/0058395 | A1* | 2/2021 | Jakobsson | H04L 67/306 |
| 2021/0117242 | A1* | 4/2021 | Van De Groenendaal | H04L 67/51 |
| 2021/0176272 | A1* | 6/2021 | Maha | H04W 4/12 |
| 2022/0086645 | A1* | 3/2022 | Kaushik | H04W 24/08 |
| 2022/0129551 | A1* | 4/2022 | Collier | G06F 21/565 |
| 2022/0374294 | A1* | 11/2022 | van der Merwe | G06F 9/4812 |
| 2023/0117962 | A1* | 4/2023 | Kaimal | H04L 41/082 726/1 |
| 2023/0300112 | A1* | 9/2023 | Wood | H04L 63/1416 726/22 |
| 2023/0308485 | A1* | 9/2023 | Jones | G06Q 10/1053 |
| 2024/0163308 | A1* | 5/2024 | Kahn | H04L 63/1458 |
| 2025/0047686 | A1* | 2/2025 | Thomas | G06F 21/552 |

* cited by examiner

400

DETERMINING EVENTS THAT PREVENT PROCESSING OF EMAIL MESSAGES

CROSS-REFERENCE TO RELATED APPLICATIONS

This application claims priority to Indian Patent Application number 202411025855, entitled, “Determining Events that Prevent Processing of Email Messages,” filed Mar. 29, 2024, which is incorporated herein by reference in its entirety.

FIELD

Embodiments relate generally to processing email messages. More particularly, embodiments relate to methods, systems, and computer-readable media that determines that a predetermined event has occurred for a request queue that processes an email message and performs a skip action in response to the predetermined event.

BACKGROUND

Client servers process a customer’s email messages by transmitting the email messages to computing systems that perform a variety of services. In some situations, one of the computing systems may not perform a service. For example, a computing system may be slow or broken. As a result, email processing is delayed or stopped altogether.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computer-implemented method includes receiving an email message to be processed by a plurality of computing systems, wherein the plurality of computing systems each provide a different service for emails. The method further includes generating a first request for a first computing system of the plurality of computing systems to process the email message. The method further includes adding the first request for the first computing system to a first request queue. The method further includes responsive to determining that a predetermined event has occurred for the first request queue, performing a skip action and removing the first request from the first request queue.

In some embodiments, the predetermined event is selected from the group of the first request remaining in the first request queue for an amount of time that exceeds a time threshold, the first computing system failing to process a queued request in the first request queue in a time window, a request queue length of the first request queue exceeding a threshold length, and combinations thereof. In some embodiments, the time threshold and the threshold length are selected based at least in part on the different services provided by the plurality of computing systems.

In some embodiments, performing the skip action comprises at least one action selected from the group of: adding a second request for a second computing system of the plurality of computing systems to process the email message to a second request queue; responsive to the first computing system performing a malware detection scanning service, determining to not deliver the email message; performing mitigation of the email message; sending an alert to an administrator, the alert indicating that the predetermined event has occurred; and combinations thereof. In some embodiments, mitigation includes modifying the email message by at least one action selected from the group of removing a uniform resource locator in the email message, removing an attachment in the email message, rewriting one or more recipients of the email in the email message, generating a read-only version of the email in the email message, adding a warning to the email message, and combinations thereof; and the method further includes delivering the modified email message.

In some embodiments, the method further includes delivering the email message; and performing a remedial action by resubmitting the email message to the first computing system; and responsive to the first computing system identifying the email message as suspicious, removing the email message from an email message inbox of a recipient or providing a warning to the recipient that identifies the email message as suspicious. In some embodiments, the plurality of computing systems perform a respective service selected from the group of scanning the email message for suspicious content, modifying the email message, routing the email message, and combinations thereof. In some embodiments, modifying the email message includes an action selected from the group of adding a warning banner to the email message, removing an attachment from the email message, rewriting a uniform resource locator (URL) in the email message to point to a URL protection service, and combinations thereof. In some embodiments, responsive to determining that the predetermined event has occurred, the method further includes storing the email message in a skipped email messages database, wherein the skipped email messages database includes an identification of the first computing system that was skipped, stored in association with the email message.

A client device comprises one or more processors and one or more computer-readable media, having instructions stored thereon that, when executed by the one or more processors, cause the one or more processors to perform operations comprising: receiving an email message to be processed by a plurality of computing systems, wherein the plurality of computing systems each provide a different service for emails; generating a first request for a first computing system of the plurality of computing systems to process the email message; adding the first request for the first computing system to a first request queue; and responsive to determining that a predetermined event has occurred for the first request queue, performing a skip action and removing the first request from the first request queue.

In some embodiments, the predetermined event is selected from the group of the first request remaining in the first request queue for an amount of time that exceeds a time threshold, the first computing system failing to process a queued request in the first request queue in a time window, a request queue length of the first request queue exceeding a threshold length, and combinations thereof. In some embodiments, the time threshold and the threshold length are selected based at least in part on the different services provided by the plurality of computing systems. In some embodiments, performing the skip action comprises at least one action selected from the group of: adding a second request for a second computing system of the plurality of computing systems to process the email message to a second request queue; responsive to the first computing system performing a malware detection scanning service, determining to not deliver the email message; performing mitigation of the email message; sending an alert to an administrator, the alert indicating that the predetermined event has occurred; and combinations thereof. In some embodiments, mitigation includes modifying the email message by at least one action selected from the group of removing a uniform resource locator in the email message, removing an attachment in the email message, rewriting one or more recipients of the email in the email message, generating a read-only version of the email in the email message, adding a warning to the email message, and combinations thereof; and the operations further comprise delivering the modified email message.

A non-transitory computer-readable medium with instructions stored thereon that, responsive to execution by a processing device, causes the processing device to perform operations comprising: receiving an email message to be processed by a plurality of computing systems, wherein the plurality of computing systems each provide a different service for emails; generating a first request for a first computing system of the plurality of computing systems to process the email message; adding the first request for the first computing system to a first request queue; and responsive to determining that a predetermined event has occurred for the first request queue, performing a skip action and removing the first request from the first request queue.

In some embodiments, the predetermined event is selected from the group of the first request remaining in the first request queue for an amount of time that exceeds a time threshold, the first computing system failing to process a queued request in the first request queue in a time window, a request queue length of the first request queue exceeding a threshold length, and combinations thereof. In some embodiments, the time threshold and the threshold length are selected based at least in part on the different services provided by the plurality of computing systems. In some embodiments, performing the skip action comprises at least one action selected from the group of: adding a second request for a second computing system of the plurality of computing systems to process the email message to a second request queue; responsive to the first computing system performing a malware detection scanning service, determining to not deliver the email message; performing mitigation of the email message; sending an alert to an administrator, the alert indicating that the predetermined event has occurred; and combinations thereof. In some embodiments, mitigation includes modifying the email message by at least one action selected from the group of removing a uniform resource locator in the email message, removing an attachment in the email message, rewriting one or more recipients of the email in the email message, generating a read-only version of the email in the email message, adding a warning to the email message, and combinations thereof; and the operations further comprise delivering the modified email message.

DETAILED DESCRIPTION

Client servers process a customer's email messages by transmitting the email messages to one or more computing systems that perform a variety of services such as scanning email messages for various kinds of unwanted content (e.g., malicious, suspicious, or sensitive information), modifying email messages (e.g., adding a warning banner, removing attachments), and many more. In some situations, the one or more computing systems may malfunction and may not perform a service. For example, a computing system may be slow or broken. A human administrator may be notified about an issue with a computing system; however, it can take some time for the administrator to respond and take action while the email messages are prevented from being delivered to recipients.

The technology described below advantageously solves the problem of delays in the delivery of email messages by employing a security application that, in response to a predetermined event related to a service performed by a first computing system in a plurality of computing systems, performs a skip action so that the other computing systems from the plurality of computing systems will continue processing the email message. The security application may additionally take additional steps to mitigate any resulting risk that occurs when processing of the email messages from the first computing device is skipped.

Threat Management System 100

Figure 1:
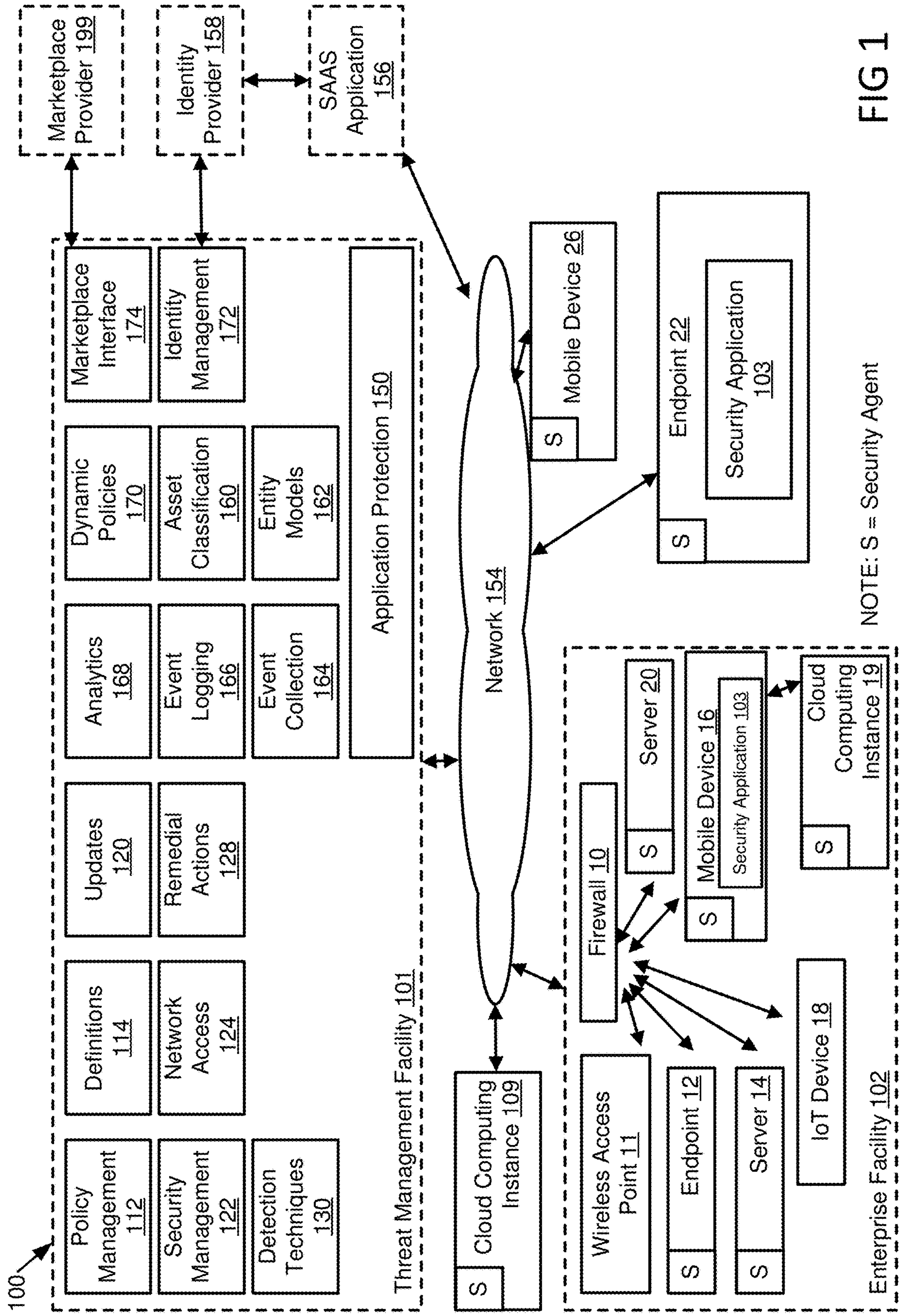
FIG. 1 depicts a block diagram of an example threat management system, according to some embodiments described herein.

FIG. 1 depicts a block diagram of a threat management system 100 providing protection against a plurality of threats, such as malware, viruses, spyware, cryptoware, adware, ransomware, trojans, spam, intrusion, policy abuse, improper configuration, vulnerabilities, improper access, uncontrolled access, and more. A threat management facility or network monitor 100 may communicate with, coordinate, and control operation of security functionality at different control points, layers, and levels within the system 100. A number of capabilities may be provided by the threat management facility 101, with an overall goal to intelligently monitor network traffic from endpoints/hosts to known security product update sites. The threat management facility 101 can monitor the traffic passively and analyze the traffic. The threat management facility 101 may be or may include a gateway such as a web security appliance that is actively routing and/or assessing the network requests for security purposes. Another overall goal is to provide protection needed by an organization that is dynamic and able to adapt to changes in compute instances and new threats due to personal or unmanaged devices using the enterprise network. According to various aspects, the threat management facility 101 may provide protection from a variety of threats to a variety of compute instances in a variety of locations and network configurations.

As one example, users of the threat management facility 101 may define and enforce policies that control access to and use of compute instances, networks, and data. Administrators may update policies such as by designating authorized users and conditions for use and access. The threat management facility 101 may update and enforce those policies at various levels of control that are available, such as by directing compute instances to control the network traffic that is allowed to traverse firewalls and wireless access points, applications, and data available from servers, applications, and data permitted to be accessed by endpoints, and network resources and data permitted to be run and used by endpoints. The threat management facility 101 may provide many different services, and policy management may be offered as one of the services.

Turning to a description of certain capabilities and components of the threat management system 100, an example enterprise facility 102 may be or may include any networked computer-based infrastructure. For example, the enterprise facility 102 may be corporate, commercial, organizational, educational, governmental, or the like. As home networks can also include more compute instances at home and in the cloud, an enterprise facility 102 may also or instead include a personal network such as a home or a group of homes. The enterprise facility's 102 computer network may be distributed amongst a plurality of physical premises, such as buildings on a campus, and located in one or in a plurality of geographical locations. The configuration of the enterprise facility as shown as one example, and it will be understood that there may be any number of compute instances, less or more of each type of compute instances, and other types of compute instances.

As shown, the example enterprise facility includes a firewall 10, a wireless access point 11, an endpoint 12, a server 14, a mobile device 16, an appliance or Internet-of-Things (IoT) device 18, a cloud computing instance 19, and a server 20. One or more of 10-20 may be implemented in hardware (e.g., a hardware firewall, a hardware wireless access point, a hardware mobile device, a hardware IoT device, a hardware etc.) or in software (e.g., a virtual machine configured as a server or firewall or mobile device). While FIG. 1 shows various elements 10-20, these are for example only, and there may be any number or types of elements in a given enterprise facility. For example, in addition to the elements depicted in the enterprise facility 102, there may be one or more gateways, bridges, wired networks, wireless networks, virtual private networks, virtual machines or compute instances, computers, and so on.

The threat management facility 101 may include certain facilities, such as a policy management facility 112, security management facility 122, update facility 120, definitions facility 114, network access rules facility 124, remedial action facility 128, detection techniques facility 130, application protection facility 150, asset classification facility 160, entity model facility 162, event collection facility 164, event logging facility 166, analytics facility 168, dynamic policies facility 170, identity management facility 172, and marketplace management facility 174, as well as other facilities. For example, there may be a testing facility, a threat research facility, and other facilities. It should be understood that the threat management facility 101 may be implemented in whole or in part on a number of different compute instances, with some parts of the threat management facility on different compute instances in different locations. For example, some or all of one or more of the various facilities 100, 112-174 may be provided as part of a security agent S that is included in software running on a compute instance 10-26 within the enterprise facility. Some or all of one or more of the facilities 100, 112-174 may be provided on the same physical hardware or logical resource as a gateway, such as a firewall 10, or wireless access point 11. Some or all of one or more of the facilities may be provided on one or more cloud servers that are operated by the enterprise or by a security service provider, such as the cloud computing instance 109.

In various implementations, a marketplace provider 199 may make available one or more additional facilities to the enterprise facility 102 via the threat management facility 101. The marketplace provider may communicate with the threat management facility 101 via the marketplace interface facility 174 to provide additional functionality or capabilities to the threat management facility 101 and compute instances 10-26. As examples, the marketplace provider 199 may be a third-party information provider, such as a physical security event provider; the marketplace provider 199 may be a system provider, such as a human resources system provider or a fraud detection system provider; the marketplace provider may be a specialized analytics provider; and so on. The marketplace provider 199, with appropriate permissions and authorization, may receive and send events, observations, inferences, controls, convictions, policy violations, or other information to the threat management facility. For example, the marketplace provider 199 may subscribe to and receive certain events, and in response, based on the received events and other events available to the marketplace provider 199, send inferences to the marketplace interface, and in turn to the analytics facility 168, which in turn may be used by the security management facility 122. According to some implementations, the marketplace provider 199 is a trusted security vendor that can provide one or more security software products to any of the compute instances described herein. In this manner, the marketplace provider 199 may include a plurality of trusted security vendors that are used by one or more of the illustrated compute instances.

The identity provider 158 may be any remote identity management system or the like configured to communicate with an identity management facility 172, e.g., to confirm identity of a user as well as provide or receive other information about users that may be useful to protect against threats. In general, the identity provider may be any system or entity that creates, maintains, and manages identity information for principals while providing authentication services to relying party applications, e.g., within a federation or distributed network. The identity provider may, for example, offer user authentication as a service, where other applications, such as web applications, outsource the user authentication step to a trusted identity provider.

The identity provider 158 may provide user identity information, such as multi-factor authentication, to a software-as-a-service (SaaS) application. Centralized identity providers may be used by an enterprise facility instead of maintaining separate identity information for each application or group of applications, and as a centralized point for integrating multifactor authentication. The identity management facility 172 may communicate hygiene, or security risk information, to the identity provider 158. The identity management facility 172 may determine a risk score for a particular user based on events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

The threat protection provided by the threat management facility 101 may extend beyond the network boundaries of the enterprise facility 102 to include clients (or client facilities) such as an endpoint 22 outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22, 26 use a network that is outside of the enterprise facility 102 and separated from the enterprise facility 102, e.g., by a gateway, a public network, and so forth. In some implementations, the endpoint 22 and/or the mobile device 26 include a security application 103 that is discussed in greater detail below.

In some implementations, compute instances 10-26 may communicate with cloud applications, such as SaaS application 156. The SaaS application 156 may be an application that is used by but not operated by the enterprise facility 102. Example commercially available SaaS applications 156 include Salesforce, Amazon Web Services (AWS) applications, Google Apps applications, Microsoft Office 365 applications, and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network or combination of these.

Aspects of the threat management facility 101 may be provided as a stand-alone solution. In other implementations, aspects of the threat management facility 101 may be integrated into a third-party product. An application programming interface (e.g., a source code interface) may be provided such that aspects of the threat management facility 101 may be integrated into or used by or with other applications. For instance, the threat management facility 101 may be stand-alone in that it provides direct threat protection to an enterprise or computer resource, where protection is subscribed to directly. Alternatively, the threat management facility may offer protection indirectly, through a third-party product, where an enterprise may subscribe to services through the third-party product, and threat protection to the enterprise may be provided by the threat management facility 101 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In some implementations, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in the security agent of an endpoint 12, in a wireless access point 11 or firewall 10, as part of application protection 150 provided by the cloud, and so on.

In an implementation, the security management facility 122 may provide for email security and control, for example to target spam, viruses, spyware and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 150 provided by the cloud, and so on.

In an implementation, security management facility 122 may provide for web security and control, for example, to detect or block viruses, spyware, malware, unwanted applications, help control web browsing, and the like, which may provide comprehensive web access control enabling safe, productive web browsing. Web security and control may provide Internet use policies, reporting on suspect compute instances, security and content filtering, active monitoring of network traffic, uniform resource identifier (URI) filtering, and the like. Aspects of the web security and control may be provided, for example, in the security agent of an endpoint 12, in a wireless access point 11 or firewall 10, as part of application protection 150 provided by the cloud, and so on.

According to one implementation, the security management facility 122 may provide for network monitoring and access control, which generally controls access to and use of network connections, while also allowing for monitoring as described herein. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. According to various implementations, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 101 or other network resource(s).

The security management facility 122 may also provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

The security management facility 122 may provide also for reputation filtering, which may target or identify sources of known malware. For instance, reputation filtering may include lists of URIs of known sources of malware or known suspicious internet protocol (IP) addresses, code authors, code signers, or domains, that when detected may invoke an action by the threat management facility 101. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall 10, as part of application protection 150 provided by the cloud, and so on. In some implementations, some reputation information may be stored on a compute instance 10-26, and other reputation data available through cloud lookups to an application protection lookup database, such as may be provided by application protection 150.

In some implementations, information may be sent from the enterprise facility 102 to a third party, such as a security vendor, or the like, which may lead to improved performance of the threat management facility 101. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. Feedback may enable the evaluation or profiling of client actions that are violations of policy that may provide a predictive model for the improvement of enterprise policies as well as detection of emerging security threats.

An update management facility 120 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In some implementations, updates may be provided to the enterprise facility's 102 network, where one or more compute instances on the enterprise facility's 102 network may distribute updates to other compute instances.

According to some implementations, network traffic associated with the update facility functions may be monitored to determine that personal devices and/or unmanaged devices are appropriately applying security updates. In this manner, even unmanaged devices may be monitored to determine that appropriate security patches, software patches, virus definitions, and other similar code portions are appropriately updated on the unmanaged devices.

The threat management facility 101 may include a policy management facility 112 that manages rules or policies for the enterprise facility 102. Example rules include access permissions associated with networks, applications, compute instances, users, content, data, and the like. The policy management facility 112 may use a database, a text file, other data store, or a combination to store policies. A policy database may include a block list, a black list, an allowed list, a white list, and more. As non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources. Example policies may be defined for an enterprise facility, application type, subset of application capabilities, organization hierarchy, compute instance type, user type, network location, time of day, connection type, or any other suitable definition. Policies may be maintained through the threat management facility 101, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In one implementation, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement.

The threat management facility 101 may provide configuration management as an aspect of the policy management facility 112, the security management facility 122, or a combination thereof. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 12, 14, 18, a version of a client firewall may be required to be running and installed. If the required version is installed but in a disabled state, the policy violation may prevent access to data or network resources. A remediation may be to enable the firewall. In another example, a configuration policy may disallow the use of uniform serial bus (USB) disks, and policy management 112 may require a configuration that turns off USB drive access via a registry key of a compute instance. Aspects of configuration management may be provided, for example, in the security agent of an endpoint 12, in a wireless access point 11 or firewall 10, as part of application protection 150 provided by the cloud, or any combination of these.

The policy management facility 112 may also require update management (e.g., as provided by the update facility 120). Update management for the security facility 122 and policy management facility 112 may be provided directly by the threat management facility 101, or, for example, by a hosted system. In some implementations, the threat management facility 101 may also provide for patch management, where a patch may be an update to an operating system, an application, a system tool, or the like, where one of the reasons for the patch is to reduce vulnerability to threats.

In some implementations, the security facility 122 and policy management facility 112 may push information to the enterprise facility 102 network and/or the compute instances 10-26, the enterprise facility 102 network and/or compute instances 10-26 may pull information from the security facility 122 and policy management facility 112, or there may be a combination of pushing and pulling of information. For example, the enterprise facility 102 network and/or compute instances 10-26 may pull update information from the security facility 122 and policy management facility 112 via the update facility 120, an update request may be based on a time period, by a certain time, by a date, on demand, or the like. In another example, the security facility 122 and policy management facility 112 may push the information to the enterprise facility's 102 network and/or compute instances 10-26 by providing notification that there are updates available for download and/or transmitting the information. In one implementation, the policy management facility 112 and the security facility 122 may work in concert with the update management facility 120 to provide information to the enterprise facility's 102 network and/or compute instances 10-26. In various implementations, policy updates, security updates, and other updates may be provided by the same or different modules, which may be the same or separate from a security agent running on one of the compute instances 10-26. Furthermore, the policy updates, security updates, and other updates may be monitored through network traffic to determine if endpoints or compute instances 10-26 correctly receive the associated updates.

As threats are identified and characterized, the definition facility 114 of the threat management facility 101 may manage definitions used to detect and remediate threats. For example, identity definitions may be used for recognizing features of known or potentially malicious code and/or known or potentially malicious network activity. Definitions also may include, for example, code or data to be used in a classifier, such as a neural network or other classifier that may be trained using machine learning. Updated code or data may be used by the classifier to classify threats. In some implementations, the threat management facility 101 and the compute instances 10-26 may be provided with new definitions periodically to include most recent threats. Updating of definitions may be managed by the update facility 120 and may be performed upon request from one of the compute instances 10-26, upon a push, or some combination. Updates may be performed at a specific a time period, on demand from a device 10-26, upon determination of an important new definition or a number of definitions, and so on.

A threat research facility (not shown) may provide a continuously ongoing effort to maintain the threat protection capabilities of the threat management facility 101 in light of continuous generation of new or evolved forms of malware. Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 101 may control access to the enterprise facility 102 networks. A network access facility 124 may restrict access to certain applications, networks, files, printers, servers, databases, and so on. In addition, the network access facility 124 may restrict user access under certain conditions, such as the user's location, usage history, need-to-know data, job position, connection type, time of day, method of authentication, client-system configuration, or the like. Network access policies may be provided by the policy management facility 112, and may be developed by the enterprise facility 102, or pre-packaged by a supplier. Network access facility 124 may determine if a given compute instance 10-22 should be granted access to a requested network location, e.g., inside or outside of the enterprise facility 102. Network access facility 124 may determine if a compute instance 22, 26 such as a device outside the enterprise facility 102 may access the enterprise facility 102. For example, in some cases, the policies may require that when certain policy violations are detected, certain network access is denied. The network access facility 124 may communicate remedial actions that are necessary or helpful to bring a device back into compliance with policy as described below with respect to the remedial action facility 128. Aspects of the network access facility 124 may be provided, for example, in the security agent of the endpoint 12, in a wireless access point 11, in a firewall 10, as part of application protection 150 provided by the cloud, and so on.

In some implementations, the network access facility 124 may have access to policies that include one or more of a block list, a black list, an allowed list, a white list, an unacceptable network site database, an acceptable network site database, a network site reputation database, or the like of network access locations that may or may not be accessed by the client facility. Additionally, the network access facility 124 may use rule evaluation to parse network access requests and apply policies. The network access rule facility 124 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 101 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, MacOS, Linux, Android, IOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility may include entity models 162. The entity models may be used, for example, to determine the events that are generated by assets. For example, some operating systems may provide useful information for detecting or identifying events. For examples, operating systems may provide process and usage information that are accessed through an application programming interface (API). As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection facility 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. An example event may be communication of a specific packet over the network. Another example event may be identification of an application that is communicating over a network. These and other events may be used to determine that a particular endpoint includes or does not include actively updated security software from a trusted vendor.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility 122. Observations or inferences about events may also be logged by the event logging facility 166.

When a threat or other policy violation is detected by the security management facility 122, the remedial action facility 128 may be used to remediate the threat. Remedial action may take a variety of forms, including collecting additional data about the threat, terminating or modifying an ongoing process or interaction, sending a warning to a user or administrator from an IT department, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 122 may take any steps or deploy any measures suitable for addressing a detection of a threat, potential threat, policy violation or other event, code or activity that might compromise security of a computing instance 10-26 or the enterprise facility 102.

Computing Device 200

Figure 2:
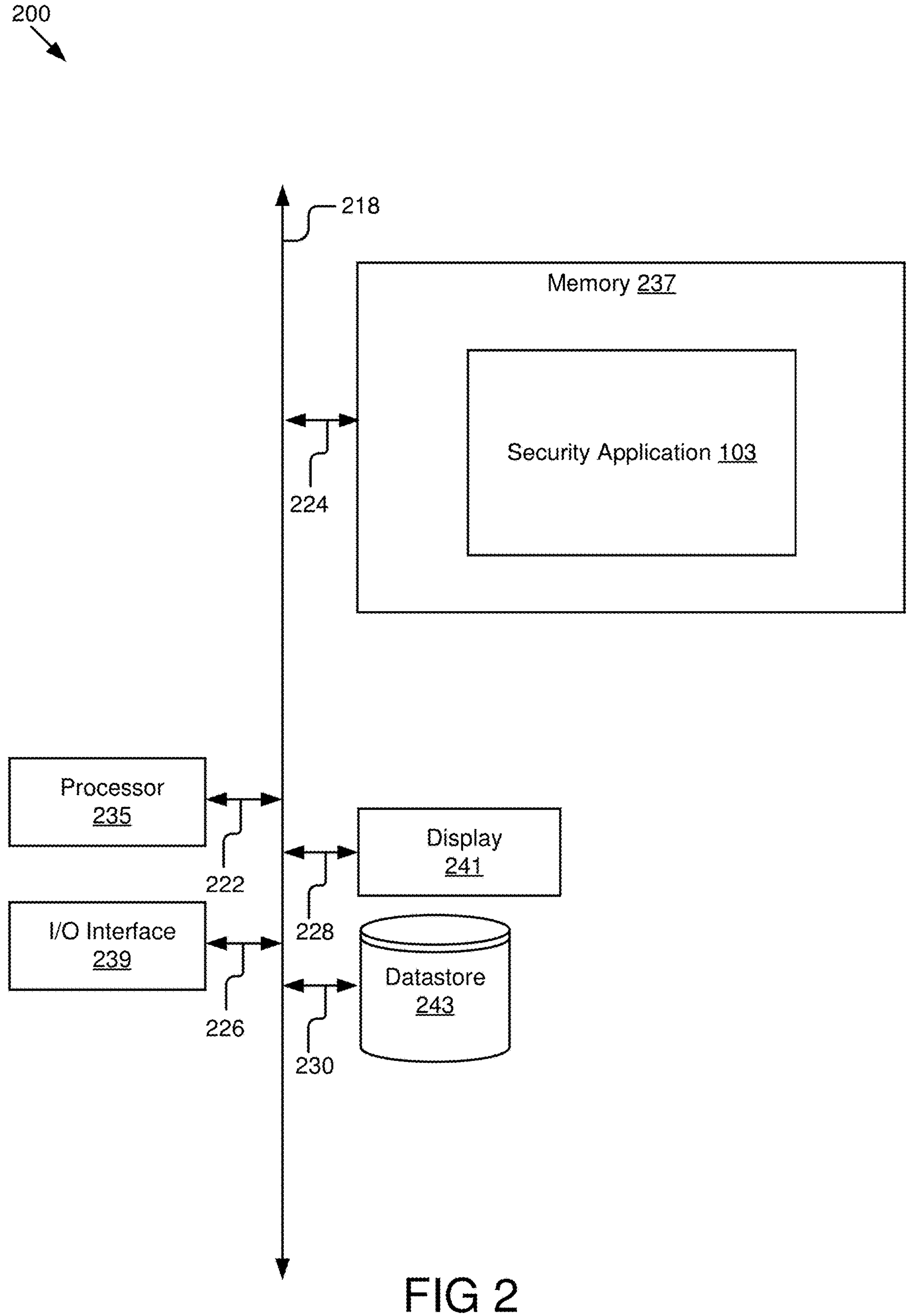
FIG. 2 is a block diagram of an example computing device, according to some embodiments described herein.

FIG. 2 is a block diagram of an example computing device 200 that may be used to implement one or more features described herein. Computing device 200 can be any suitable computer system, server, or other electronic or hardware device. In some embodiments, computing device 200 is part of the enterprise facility 102 in FIG. 1. For example, the computing device may be the mobile device 16, the server 13, the server 20, etc. In some embodiments, the computing device 200 is the endpoint 22 illustrated in FIG. 1.

In some embodiments, computing device 200 includes a processor 235, a memory 237, an input/output (I/O) interface 239, a display 241, and a datastore 243, all coupled via a bus 218. The processor 235 may be coupled to the bus 218 via signal line 222, the memory 237 may be coupled to the bus 218 via signal line 224, the I/O interface 239 may be coupled to the bus 218 via signal line 226, the display 241 may be coupled to the bus 218 via signal line 228, and the datastore 243 may be coupled to the bus 218 via signal line 230.

The processor 235 includes an arithmetic logic unit, a microprocessor, a general-purpose controller, or some other processor array to perform computations and provide instructions to a display device. Processor 235 processes data and may include various computing architectures including a complex instruction set computer (CISC) architecture, a reduced instruction set computer (RISC) architecture, or an architecture implementing a combination of instruction sets. Although FIG. 2 illustrates a single processor 235, multiple processors 235 may be included. In different embodiments, processor 235 may be a single-core processor or a multicore processor. Other processors (e.g., graphics processing units), operating systems, sensors, displays, and/or physical configurations may be part of the computing device 200.

The memory 237 may be a computer-readable media that stores instructions that may be executed by the processor 235 and/or data. The instructions may include code and/or routines for performing the techniques described herein. The memory 237 may be a dynamic random access memory (DRAM) device, a static RAM, or some other memory device. In some embodiments, the memory 237 also includes a non-volatile memory, such as a static random access memory (SRAM) device or flash memory, or similar permanent storage device and media including a hard disk drive, a compact disc read only memory (CD-ROM) device, a DVD-ROM device, a DVD-RAM device, a DVD-RW device, a flash memory device, or some other mass storage device for storing information on a more permanent basis.

The memory 237 includes code and routines operable to execute the security application 103, which is described in greater detail below.

I/O interface 239 can provide functions to enable interfacing the computing device 200 with other systems and devices. Interfaced devices can be included as part of the computing device 200 or can be separate and communicate with the computing device 200. For example, network communication devices, storage devices (e.g., memory 237 and/or datastore 243), and input/output devices can communicate via I/O interface 239. In another example, the I/O interface 239 can receive data, such as email messages, from a user device 115 and deliver the data to the security application 103. In some embodiments, the I/O interface 239 can connect to interface devices such as input devices (keyboard, pointing device, touchscreen, microphone, camera, scanner, sensors, etc.) and/or output devices (display devices, speaker devices, printers, monitors, etc.).

Some examples of interfaced devices that can connect to I/O interface 239 can include a display 241 that can be used to display content, e.g., an email message received from the sender. The display 241 can include any suitable display device such as a liquid crystal display (LCD), light emitting diode (LED), or plasma display screen, cathode ray tube (CRT), television, monitor, touchscreen, three-dimensional display screen, or other visual display device.

The datastore 243 may store data related to the security application 103. For example, the datastore 243 may store, with user permission, emails, corresponding determinations from the set of scanners, approvals from users of particular roles, content identifiers and corresponding true or false designations, etc. The datastore 243 may be coupled to the bus 218 via signal line 230.

In some embodiments, one or more components of the computing device 200 may not be present depending on the type of computing device 200. For example, if the computing device 200 is a server, the computing device 200 may not include the display 241.

FIG. 2 illustrates a computing device 200 that executes an example security application 103 stored in memory 237 of the computing device 200. The security application 103 receives an email message to be processed by a plurality of computing systems, where the plurality of computing systems each provide a different service for emails. The security application 103 generates a request for a first computing system of the plurality of computing systems to process the email message. For example, the first computing system may include scanning the email message for suspicious content, modifying the email message, routing the email message, etc.

The security application 103 adds the request for the first computing system to a request queue. Responsive to determining that a predetermined event has occurred for the request queue, the security application 103 performs a skip action and removes the request from the request queue. The predetermined event may include the email message remaining in the first request queue for an amount of time that exceeds a time threshold, the first computing system failing to process a queued request in the first request queue in a time window, a request queue length of the first request queue exceeding a threshold length, etc.

Figure 3:
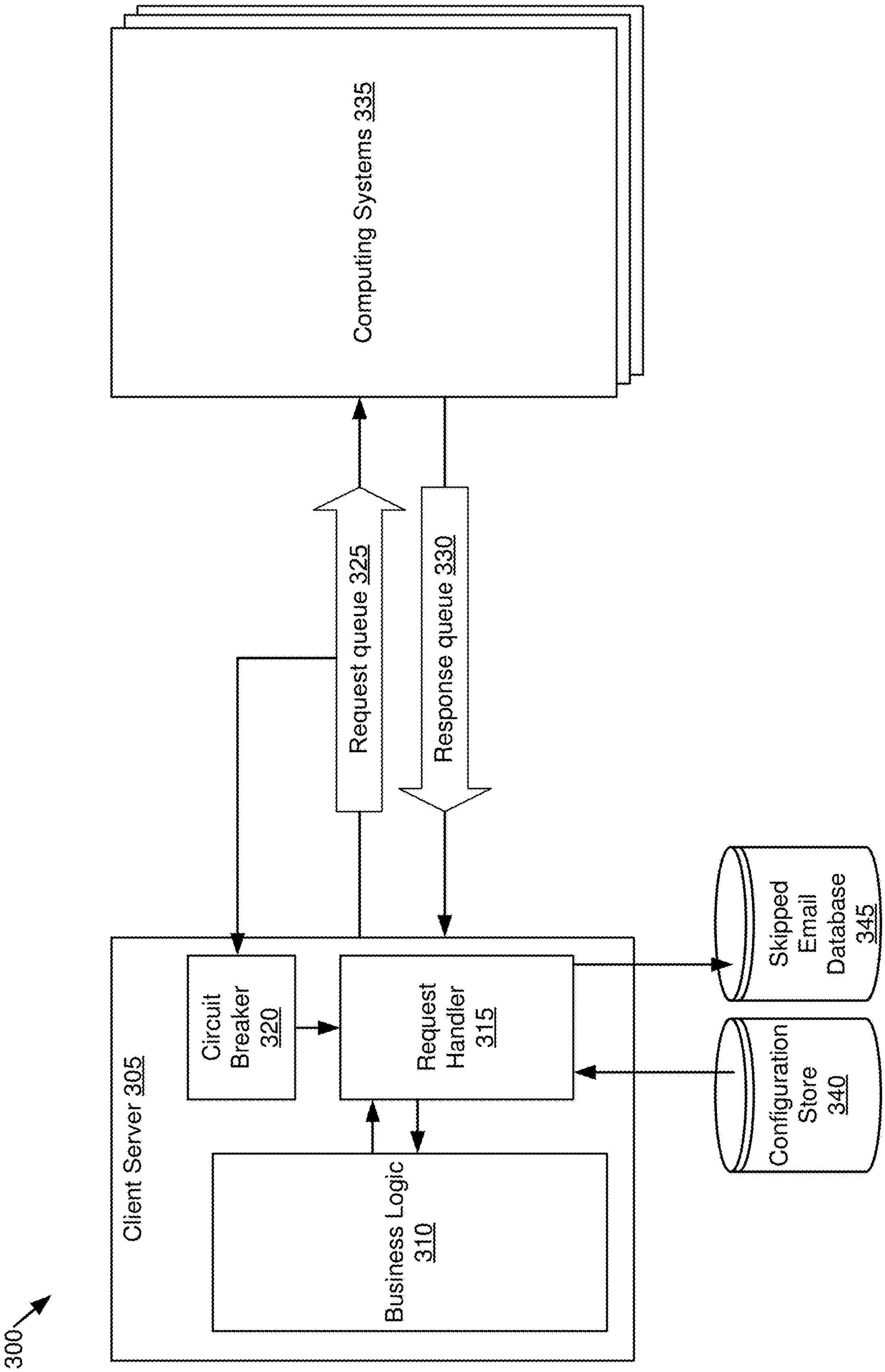
FIG. 3 is a block diagram of an example client server and an example computing systems, according to some embodiments described herein.

FIG. 3 is a block diagram 300 of an example client server 305 and example computing systems 335. The client server 305 may include business logic 310, a request handler 315, and a circuit breaker 320. In some embodiments, the security application 103 in FIG. 2 includes the business logic 310, the request handler 315, and the circuit breaker 320. The business logic 310, the request handler 315, and the circuit breaker 320 are software components that are described in greater detail below. In some embodiments, the client server 305 is a complete email processing orchestration service. Alternatively, the client server 305 may be a service, such as a malware scanner that calls other dependent computing systems 335 relating to different kinds of malware.

The block diagram 300 includes a configuration store 340 and a skipped email database 345. Although the configuration store 340 and the skipped email database 345 are illustrated as being separate from the client server 305, in some embodiments the configuration store 340 and the skipped email database 345 are part of the client server 305.

The client server 305 receives an email message to be processed by one or more computing systems 335. The business logic 310 implements the main functionality of the client server 305. For example, where the client server 305 performs a scanning service, the business logic 310 is responsible for the functions related to the scanning.

The business logic 310 generates one or more requests for the one or more computing systems 335 to process an email message. The one or more requests include metadata that describe the email message and particularities of the one or more requests.

The request handler 315 manages communications between the different components in the client server 305 and the computing systems 335. The business logic 310 provides the one or more requests to the request handler 315, which adds each request of the one or more requests to a request queue 325 for the one or more computing systems 335.

In some embodiments, for example, a first request queue 325*a* is associated with a first computing system 335*a*, a second request queue 325*n* is associated with a second computing system 335*n*, etc. When a computing system 335 accepts an email message for processing, a corresponding request is removed from the request queue 325. Once the email message is processed, the computing system 335 generates a response, which is added to the response queue 330 and transmitted back to the request handler 315, which forwards the response to the business logic 310.

Each computing system 335 of the one or more computing systems 335 provides a different service for emails. For example, a first computing system 335*a* may scan the email message for suspicious content, such as scanning for malicious content, scanning for suspicious content, scanning for prohibited content, scanning for personally identifiable information, etc. A second computing system 335*b* may modify the email message, for example, by adding a warning banner to the email message, removing an attachment from the email message, removing a uniform resource locator (URL) in the email message, rewriting a URL in the email message to point to a URL protection service, generate a read-only version of the email message, etc. A third computing system 335*n* may route the email message to an intended location and to an intended recipient, reroute the email message to a different location, send the email message to quarantine, route the email message to additional recipients, etc.

In some embodiments, each computing system 335 of the one or more computing systems 335 is associated with a ranking or a level of importance. For example, a computing system 335 that scans for malicious content may have a higher ranking or higher level of importance than a computing system 335 that identifies email messages that are spam.

A predetermined event may occur that prevents one or more of the computing systems 335 from processing the email message efficiently. For example, a request may remain in the request queue for an amount of time that exceeds a time threshold, the computing system 335 may fail to process a queued request in the request queue in a time window, a request queue length of the request queue may exceed a threshold length, etc.

In some embodiments, the rules for what constitutes a predetermined event, a ranking or a level of importance associated with the computing systems 335, and other factors related to determining the predetermined event (e.g., based on a type of computing service) are stored in the configuration store 340. The configuration store 340 may also store other configuration data that specifies the behavior of the circuit breaker 320 and the request handler 315. In some embodiments, the configuration store 340 further includes configuration rules that describe how remediation and mitigation of risks occur.

In some embodiments, the time threshold and the threshold length may vary depending on different services provided by the one or more computing systems 335. For example, a computing system 335 associated with a lower ranking or a lower level of importance may have a shorter time threshold or shorter threshold length than a computing system 335 associated with a higher ranking or a higher level of importance. For example, a computing system 335 that adds a disclaimer footer to an email message may be associated with a lower ranking or a lower level of importance, so the time threshold and/or the length threshold may be set lower where the tradeoff is in favor of delivering the email message. In another example, a computing system 335 that detects malicious content in email messages may be associated with a higher ranking or a higher level of importance, so the time threshold and/or the length threshold may be set higher where the tradeoff is in favor of delaying the email message until the computing system 335 may process the email message or where a remediation step is available.

As a result, a delay in a service from a computing system 335 that is less important, such as a computing system 335 that adds an additional recipient to an email, may be less tolerable than a delay from a computing system 335 that inactivates URLs that may link to ransomware because the latter service protects users from harmful ransomware attacks.

A circuit breaker 320 may determine that a predetermined event has occurred. Responsive to the occurrence of the predetermined event, the circuit breaker 320 notifies the request handler 315 that the predetermined event occurred. The request handler 315 performs a skip action and removes the request from the request queue. The request handler 315 may also notify the business logic 310 that the predetermined event occurred. In some embodiments, the request handler 315 stores details of each skip action in the skipped email database 345.

Once the predetermined event has occurred, the computing system 335 may correct the issue causing a delay or failure to process email messages or an administrator may reset the computing system 335. After the issue with the computing system 335 is resolved, the circuit breaker 320 resets itself.

The skip action may include one or more of the following multiple actions. In some embodiments, performing the skip action includes the business logic 310 adding a second request for a second computing system 335*b* to process the email message to a second request queue 325*b*. In some embodiments, the business logic may determine that the first computing system 335*a* is important enough that skipping the associated service may risk causing harm to a recipient's user device. As a result, in response to the occurrence of a predetermined event, the business logic 310 may determine to not deliver the email message. For example, the business logic 310 may determine to not deliver the email message when the first computing system 335 performs a malware detection scanning service. In some embodiments, the business logic 310 may send an alert to an administrator where the alert indicates that the predetermined event has occurred. These actions may be combined in various ways. For example, the business logic 310 may add a second request to a second request queue so that the email message is processed by the next computing system 335 while also sending an alert to an administrator so that the administrator can resolve an issue with the first computing system 335.

In some embodiments, the business logic 310 may perform mitigation actions that include one or more of removing any URLs in the email message, rewriting one or more recipients of the email message, and/or generating a read-only version of the email message. As a result of the mitigation actions, the business logic 310 renders the email message harmless so that the email message may be delivered to a recipient with a minimized threat to the recipient.

In some embodiments, after an email message is delivered to a recipient, the business logic 310 may perform a remedial action by retrieving a list of the email messages that were skipped by the computing system 335 from the skipped email database 345 and resubmitting the email messages to the computing system 335 that was skipped. The resubmitted email messages may be marked with flags indicating that the email messages are resubmissions. If the computing system 335 identifies any of the email messages as suspicious, the business logic 310 may remove the email messages from email message inbox of corresponding recipients or provide warning to the corresponding recipients that identify the email messages as suspicious. In some embodiments, the business logic 310 may generate a report listing the email messages that skipped the computing system 335.

Example User Interface 400

Figure 4:
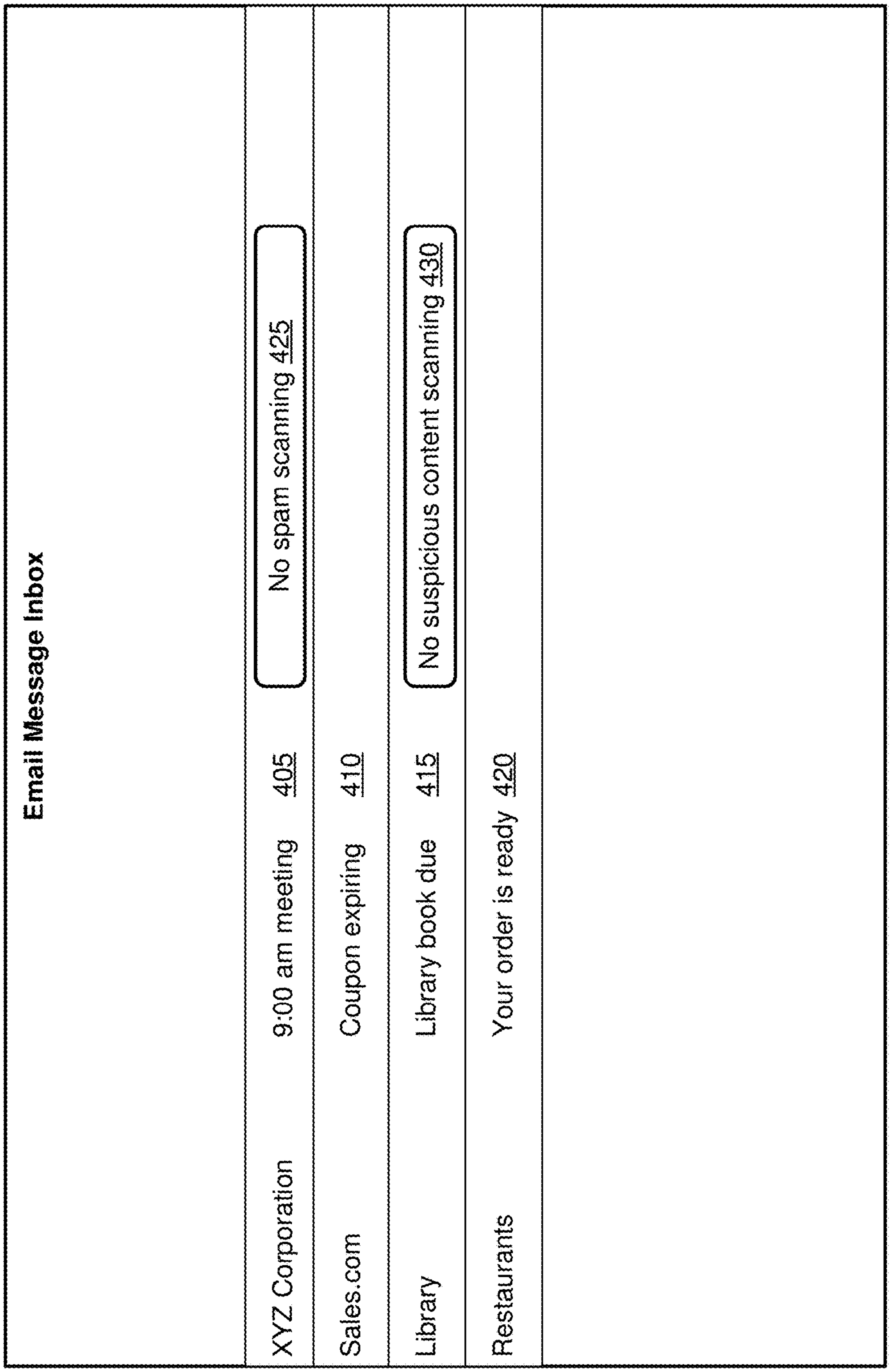
FIG. 4 is an example user interface of an email message inbox that includes email messages with warnings when an action related to a computer system was skipped, according to some embodiments described herein.

FIG. 4 is an example user interface 400 of an email message inbox that includes email messages with warnings when an action related to a computer system was skipped. The user interface 400 includes a first email message 405 from XYZ Corporation titled "9:00 am meeting," a second email 410 from Sales.com titled "Coupon expiring," a third email message 415 from the Library titled "Library book due," and a fourth email 420 from Restaurants titled "Your order is ready."

In this example, a security application determined that a predetermined event occurred for a first computing system related to spam scanning and a second computing system related to suspicious content scanning. In both cases, in response to determining that the predetermined event occurred, the security application performed a skip action and removed a first request from a first request queue and a second request from a second request queue, respectively. The security application requested a list of skipped email messages from a skipped email database 345 and performed a mitigation action of adding a warning to each of the email messages before delivering the email messages to the recipient. The first email message 405 includes a first warning 425 that the first email message 405 was not scanned for spam. The third email message 415 includes a second warning 430 that the third email message 415 was not scanned for suspicious content. The recipient still has the option to read any of the email messages in the email message inbox. In some embodiments, the third email message 415 may be a read-only version of the email message because the third email message 415 was not scanned for suspicious content, which may include viruses and other harmful risks.

Example Method 500

Figure 5:
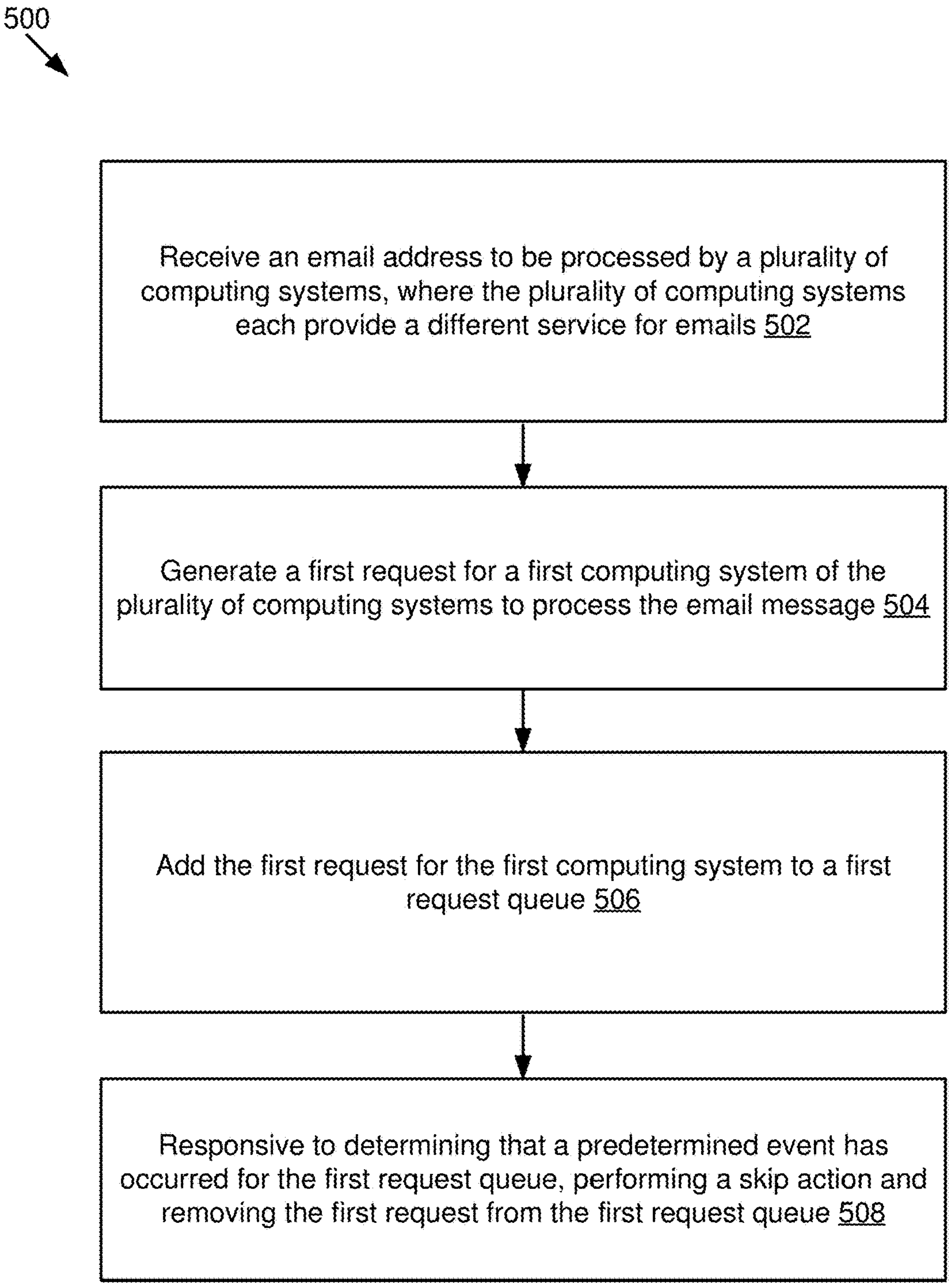
FIG. 5 is a flow diagram of an example method to determine that a predetermined event occurred for a request queue for processing an email message and perform a skip action, according to some embodiments described herein.

FIG. 5 is a flow diagram of an example method 500 to determine that a predetermined event occurred and perform a skip action. The method 500 may be performed by a computing device 200 that includes a security application 103.

The method 500 may begin at block 502. At block 502, an email message to be processed by a plurality of computing systems is received, where the plurality of computing systems each provide a different service for emails. The plurality of computing systems may perform a respective service selected from the group of scanning the email message for suspicious content, modifying the email message, routing the email message, and combinations thereof. Scanning the email message for suspicious content may include an action selected from the group of scanning for malicious content, scanning for suspicious content, scanning for prohibited information, scanning for personally identifiable information, and combinations thereof. Modifying the email message may include an action selected from the group of adding a warning banner to the email message, removing an attachment from the email message, rewriting a uniform resource locator (URL) in the email message to point to a URL protection service, and combinations thereof. Block 502 may be followed by block 504.

At block 504, a first request for a first computing system of the plurality of computing systems to process the email message is generated. Block 504 may be followed by block 506.

At block 506, the first request for the first computing system is added to a first request queue. Block 506 may be followed by block 508.

At block 508, responsive to determining that a predetermined event has occurred for the first request queue, a skip action is performed and the first request is removed from the first request queue. The predetermined event may be selected from the group of the first request remaining in the first request queue for an amount of time that exceeds a time threshold, the first computing system failing to process a queued request in the first request queue in a time window, a request queue length of the first request queue exceeding a threshold length, and combinations thereof. The time threshold and the threshold length may be selected based at least in part on the different services provided by the plurality of computing systems. Responsive to determining that the predetermined event has occurred, the method may further include storing the email message in a skipped email messages database, wherein the skipped email messages database includes an identification of the first computing system that was skipped, stored in association with the email message.

Performing the skip action may include one or more actions selected from the group of: adding a second request for a second computing system of the plurality of computing systems to process the email message to a second request queue, responsive to the first computing system performing a malware detection scanning service, determining to not deliver the email message, performing mitigation of the email message, sending an alert to an administrator, the alert indicating that the predetermined event has occurred, and combinations thereof. Mitigation may include modifying the email message by at least one action selected from the group of removing a uniform resource locator in the email message, removing an attachment in the email message, rewriting one or more recipients of the email in the email message, generating a read-only version of the email in the email message, adding a warning to the email message, and combinations thereof. The method may further include delivered the modified email message.

The method may further include delivering the message and performing a remedial action by resubmitting the email message to the first computing system and responsive to the first computing system identifying the email message as suspicious, removing the email message from an email message inbox of a recipient or providing a warning to the recipient that identifies the email message as suspicious.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the embodiments can be described above primarily with reference to user interfaces and particular hardware. However, the embodiments can apply to any type of computing device that can receive data and commands, and any peripheral devices providing services.

Reference in the specification to "some embodiments" or "some instances" means that a particular feature, structure, or characteristic described in connection with the embodiments or instances can be included in at least one implementation of the description. The appearances of the phrase "in some embodiments" in various places in the specification are not necessarily all referring to the same embodiments.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The embodiments of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including optical disks, ROMs, CD-ROMs, magnetic disks, RAMS, EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

What is claimed is:

1. A computer-implemented method comprising:
- receiving an email message to be processed by a plurality of computing systems, wherein the plurality of computing systems each provide a different service for emails;
- generating a first request for a first computing system of the plurality of computing systems to process the email message;
- adding the first request for the first computing system to a first request queue; and
- responsive to determining that a predetermined event has occurred for the first request queue,
  - performing a skip action and removing the first request from the first request queue; and
  - storing the email message in a skipped email messages database, wherein the skipped email messages database includes an identification of the first computing system that was skipped, stored in association with the email message.

2. The method of claim 1, wherein the predetermined event is selected from the group of the first request remaining in the first request queue for an amount of time that exceeds a time threshold, the first computing system failing to process a queued request in the first request queue in a time window, a request queue length of the first request queue exceeding a threshold length, and combinations thereof.

3. The method of claim 2, wherein the time threshold and the threshold length are selected based at least in part on respective different services provided by the plurality of computing systems.

4. The method of claim 1, wherein performing the skip action comprises at least one action selected from the group of:
- adding a second request for a second computing system of the plurality of computing systems to process the email message to a second request queue;
- responsive to the first computing system performing a malware detection scanning service, determining to not deliver the email message;
- performing mitigation of the email message;
- sending an alert to an administrator, the alert indicating that the predetermined event has occurred; and
- combinations thereof.

5. The method of claim 4, wherein:
- performing the mitigation includes modifying the email message by at least one action selected from the group of removing a uniform resource locator in the email message, removing an attachment in the email message, rewriting one or more recipients of the email message, generating a read-only version of the email message, adding a warning to the email message, and combinations thereof; and
- the method further comprises delivering the modified email message.

6. The method of claim 1, further comprising:
- delivering the email message; and
- performing a remedial action by:
  - resubmitting the email message to the first computing system; and
  - responsive to the first computing system identifying the email message as suspicious, removing the email message from an email message inbox of a recipient or providing a warning to the recipient that identifies the email message as suspicious.

7. The method of claim 1, wherein the plurality of computing systems perform a respective service selected from the group of scanning the email message for suspicious content, modifying the email message, routing the email message, and combinations thereof.

8. The method of claim 7, wherein scanning the email message for suspicious content includes an action selected from the group of scanning for malicious content, scanning for prohibited information, scanning for personally identifiable information, and combinations thereof.

9. The method of claim 7, wherein modifying the email message includes an action selected from the group of adding a warning banner to the email message, removing an attachment from the email message, rewriting a uniform resource locator (URL) in the email message to point to a URL protection service, and combinations thereof.

10. A client device comprising:
- one or more processors; and
- one or more computer-readable media coupled to the one or more processors, having instructions stored thereon that, when executed by the one or more processors, cause the one or more processors to perform operations comprising:
- receiving an email message to be processed by a plurality of computing systems, wherein the plurality of computing systems each provide a different service for emails;
- generating a first request for a first computing system of the plurality of computing systems to process the email message;
- adding the first request for the first computing system to a first request queue; and responsive to determining that a predetermined event has occurred for the first request queue, performing a skip action and removing the first request from the first request queue;

wherein the predetermined event is selected from the group of the first request remaining in the first request queue for an amount of time that exceeds a time threshold, the first computing system failing to process a queued request in the first request queue in a time window, a request queue length of the first request queue exceeding a threshold length, and combinations thereof; and wherein the time threshold and the threshold length are selected based at least in part on respective different services provided by the plurality of computing systems.

11. The client device of claim 10, wherein the operations further include:

delivering the email message; and performing a remedial action by:

resubmitting the email message to the first computing system; and responsive to the first computing system identifying the email message as suspicious, removing the email message from an email message inbox of a recipient or providing a warning to the recipient that identifies the email message as suspicious.

12. The client device of claim 11, wherein the plurality of computing systems perform a respective service selected from the group of scanning the email message for suspicious content, modifying the email message, routing the email message, and combinations thereof.

13. The client device of claim 10, wherein performing the skip action comprises at least one action selected from the group of:

adding a second request for a second computing system of the plurality of computing systems to process the email message to a second request queue;

responsive to the first computing system performing a malware detection scanning service, determining to not deliver the email message;

performing mitigation of the email message;

sending an alert to an administrator, the alert indicating that the predetermined event has occurred; and combinations thereof.

14. The client device of claim 13, wherein:

performing the mitigation includes modifying the email message by at least one action selected from the group of removing a uniform resource locator in the email message, removing an attachment in the email message, rewriting one or more recipients of the email message, generating a read-only version of the email message, adding a warning to the email message, and combinations thereof; and the operations further comprise delivering the modified email message.

15. A non-transitory computer-readable medium with instructions stored thereon that, responsive to execution by one or more processing devices, cause the one or more processing devices to perform operations comprising:

receiving an email message to be processed by a plurality of computing systems, wherein the plurality of computing systems each provide a different service for emails;

generating a first request for a first computing system of the plurality of computing systems to process the email message;

adding the first request for the first computing system to a first request queue; and responsive to determining that a predetermined event has occurred for the first request queue, performing a skip action and removing the first request from the first request queue;

wherein the predetermined event is selected from the group of the first request remaining in the first request queue for an amount of time that exceeds a time threshold, the first computing system failing to process a queued request in the first request queue in a time window, a request queue length of the first request queue exceeding a threshold length, and combinations thereof; and wherein the time threshold and the threshold length are selected based at least in part on respective different services provided by the plurality of computing systems.

16. The computer-readable medium of claim 15, wherein the operations further comprise:

delivering the email message; and performing a remedial action by:

resubmitting the email message to the first computing system; and responsive to the first computing system identifying the email message as suspicious, removing the email message from an email message inbox of a recipient or providing a warning to the recipient that identifies the email message as suspicious.

17. The computer-readable medium of claim 16, wherein the plurality of computing systems perform a respective service selected from the group of scanning the email message for suspicious content, modifying the email message, routing the email message, and combinations thereof.

18. The computer-readable medium of claim 15, wherein performing the skip action comprises at least one action selected from the group of:

adding a second request for a second computing system of the plurality of computing systems to process the email message to a second request queue;

responsive to the first computing system performing a malware detection scanning service, determining to not deliver the email message;

performing mitigation of the email message;

sending an alert to an administrator, the alert indicating that the predetermined event has occurred; and combinations thereof.

19. The computer-readable medium of claim 18, wherein:

performing the mitigation includes modifying the email message by at least one action selected from the group of removing a uniform resource locator in the email message, removing an attachment in the email message, rewriting one or more recipients of the email message, generating a read-only version of the email message, adding a warning to the email message, and combinations thereof; and the operations further comprise delivering the modified email message.

20. The computer-readable medium of claim 15, wherein responsive to determining that the predetermined event has occurred, the operations further comprise storing the email message in a skipped email messages database, wherein the skipped email messages database includes an identification of the first computing system that was skipped, stored in association with the email message.

* * * * *